United States Patent
He et al.

(10) Patent No.: US 11,874,640 B2
(45) Date of Patent: Jan. 16, 2024

(54) WIND POWER PREDICTION METHOD AND SYSTEM FOR OPTIMIZING DEEP TRANSFORMER NETWORK

(71) Applicant: WUHAN UNIVERSITY, Hubei (CN)

(72) Inventors: Yigang He, Hubei (CN); Lei Wang, Hubei (CN); Yingying Zhao, Hubei (CN); Ming Xiang, Hubei (CN); Lie Li, Hubei (CN); Liulu He, Hubei (CN)

(73) Assignee: WUHAN UNIVERSITY, Hubei (CN)

(*) Notice: Subject to any disclaimer, the term of this patent is extended or adjusted under 35 U.S.C. 154(b) by 272 days.

(21) Appl. No.: 17/496,778

(22) Filed: Oct. 8, 2021

(65) Prior Publication Data
US 2022/0197233 A1    Jun. 23, 2022

(30) Foreign Application Priority Data
Dec. 18, 2020 (CN) .......................... 202011501748.1

(51) Int. Cl.
*G05B 19/042* (2006.01)
*H02J 3/00* (2006.01)
*H02J 3/38* (2006.01)

(52) U.S. Cl.
CPC ............ *G05B 19/042* (2013.01); *H02J 3/004* (2020.01); *H02J 3/381* (2013.01); *G05B 2219/2619* (2013.01); *G05B 2219/2639* (2013.01); *H02J 2203/20* (2020.01); *H02J 2300/28* (2020.01)

(58) Field of Classification Search
CPC .......... G05B 19/042; G05B 2219/2619; G05B 2219/2639; H02J 3/004; H02J 3/381; H02J 2203/20; H02J 2300/28; G06F 30/27; G06N 3/006; G06N 3/08; G06N 3/045
See application file for complete search history.

(56) References Cited

FOREIGN PATENT DOCUMENTS

| CN | 110516831 A | * | 11/2019 |
| CN | 111080032 A | * | 4/2020 |

* cited by examiner

*Primary Examiner* — Charles Cai
(74) *Attorney, Agent, or Firm* — JCIPRNET

(57) ABSTRACT

A wind power prediction method and system for optimizing a deep Transformer network by whale optimization algorithm are disclosed. The sequence data of wind power and related influence factors are taken as sample data which is divided into a training set and a test set, where the data is trained and predicted by a Transformer network model established according to values of the initialized hyper-parameters, and an average absolute error of wind power prediction is taken as a fitness value of each whale group. A local optimal position is determined according to the initial fitness value of individual whale group, and the current optimal position is updated by utilizing whale group optimization, and the best prediction effect is obtained by comparing the local optimal solution with the global optimal solution. An optimal hyper-parameter combination is obtained after multiple iterations of the whale optimization algorithm, and the wind power is predicted.

9 Claims, 4 Drawing Sheets

WIND POWER PREDICTION METHOD AND SYSTEM FOR OPTIMIZING DEEP TRANSFORMER NETWORK

CROSS-REFERENCE TO RELATED APPLICATION

This application claims the priority benefit of China application serial no. 202011501748.1, filed on Dec. 18, 2020. The entirety of the above-mentioned patent application is hereby incorporated by reference herein and made a part of this specification.

BACKGROUND

Field of the Disclosure

The disclosure is related to the field of power system planning, and more specifically, relates to a wind power prediction method and system for optimizing a deep Transformer network based on a whale optimization algorithm.

Description of Related Art

Due to the shortage of fossil fuels, environmental pollution and greenhouse effect problems have become increasingly serious, and the development and utilization of renewable energy has gradually received worldwide attention. Wind energy is a clean energy with enormous reserves and high development potential. Wind power generation is one of the main forms of wind energy utilization, and has received increasing attention from researchers in recent years. When using wind energy to generate electricity on a large scale, it is necessary to predict wind power to ensure the reliability, stability and economy of the grid. Prediction on wind power generation is a crucial part in the integration of wind farms, and can provide an effective basis for power generation, dispatch and maintenance of the power system. Accurate prediction results will greatly reduce the peaking pressure caused by wind power grid integration, reduce the impact on the grid, and ensure safe operation of the grid. Therefore, the research of wind power prediction is of important practical significance. The randomness and volatility characteristics of wind energy cause the output power of wind power unstable, which increases the difficulty of research on wind power prediction. Deep learning methods have powerful data acquisition functions and have received considerable attention. Wind energy data is a time sequence with long-range correlation and this sequence has complex dependencies of various lengths. Conventional neural networks with loop structure, such as: Recursive Neural Network (RNN), Long Short-Term Memory (LSTM) and Gated Recurrent Unit (GRU) are found to have difficulties in processing this complex time sequence, and the inability to perform parallel operations results in long model training time.

SUMMARY OF THE DISCLOSURE

In view of the above defects or need for improvement of the conventional technologies, the disclosure provides a wind power prediction method and system for optimizing a deep Transformer network, which can improve the efficiency and accuracy of wind power prediction.

In order to achieve the above purpose, according to one aspect of the disclosure, a wind power prediction method for optimizing a deep Transformer network is provided, including: taking the collected sequence data of wind power and related influence factors as sample data; performing maximum and minimum normalization processing on all sample data, and dividing the normalized sample data into a training set and a test set; initializing the Transformer network parameters, setting the value range and search range of the hyper-parameters in the Transformer network to be optimized, and determining the maximum number of iteration and population size of the whale group; establishing a Transformer network model according to the values of hyper-parameters in the initialized Transformer network, respectively training and predicting data in the training set and the test set, and taking an average absolute error of wind power prediction as a fitness value of each whale group; determining a local optimal position according to the initial fitness value of the individual whale group, updating the current optimal position by utilizing whale group optimization, and obtaining an optimal prediction effect by comparing the local optimal solution with the global optimal solution; obtaining an optimal hyper-parameter combination in the Transformer network after a plurality of iterations of the whale optimization algorithm WOA, and predicting the wind power by using the optimal parameters to construct a WOA-Transformer wind power prediction model.

In some optional implementations, the step of obtaining an optimal hyper-parameter combination in the Transformer network after a plurality of iterations of the whale optimization algorithm WOA includes: taking the hyper-parameters in the Transformer network as the individuals in the whale group, initializing the whale group, and using a random number generator to automatically generate the initial solution of the hyper-parameters in the Transformer network; if the value of the random parameter p is less than the first preset value, then it is determined whether the coefficient vector |A| is less than the second preset value, and if the coefficient vector |A| is less than the second preset value, then the shrink-envelopment predation mechanism is selected, the position of individual is updated according to A=2a·r−a, C=2r and $$a = 2 - \frac{2j}{M},$$

if the coefficient vector |A| is not less than the second preset value, then the search and predation mechanism is selected, and the position of individual is updated according to $$\begin{cases} X = X_{rand} - A \cdot D \\ D = |C \cdot X_{rand,j} - X| \end{cases},$$

in the expression, a is a constant corresponding to the current number of iterations j, and a is a matrix that is formed by the constant a during the iterations, M is the maximum number of iterations, r is a random vector and r∈[0,1], $X_{rand}$ represents the current random position vector of the humpback whale population, $X_{rand,j}$ represents the j-th data in $X_{rand}$, if the value of the random parameter p is not less than the first preset value, then the spiral predation mechanism is selected, and the position of individual is updated according to $$\begin{cases} X_{j+1} = D'e^{bl}\cos(2\pi l) + X_j^* \\ D' = |X_j^* - X_j| \end{cases},$$

in the expression, $X_j$, $X_{j+1}$ and $X^*_j$ respectively represent the current position, the position at the next moment, and the optimal position of the whale group, D represents the spatial distance between the current optimal position of the i-th whale and the optimal value, b is a logarithmic spiral constant, l is a random number and l∈[−1,1]; calculating the fitness values of all individuals in the whale group and updating the global optimal value, and obtaining the optimal hyper-parameter combination in the Transformer network after a plurality of iterations of the whale optimization algorithm WOA.

In some optional implementations, the Transformer network model includes an encoder and a decoder. The encoder is composed of an input layer, a position encoding layer, and multiple identical encoder layers arranged in a stack. The input layer maps the input data into a multi-dimensional vector through a fully connected layer. The position encoding layer adds up the input vector and the position encoding vector element by element, and the vector obtained through addition is fed to each encoder layer. Each encoder layer contains two sub-layers: a self-attention layer and a fully connected feedforward layer, each sub-layer is followed by a norm layer, and the multi-dimensional vector generated by the encoder is fed to the decoder.

The decoder is composed of an input layer, multiple identical decoder layers and an output layer arranged in a stack. The input layer maps the input of decoder into a multi-dimensional vector. Each decoder layer not only contains two sub-layers in the encoder layer, but also is inserted with an encoding-decoding attention layer to apply the self-attention mechanism to the output of the encoder. The output layer contains a single neuron. The output layer maps the output of the last decoder layer to obtain the value for wind power prediction.

In some optional implementations, the step of predicting the wind power by using the optimal parameters to construct a WOA-Transformer wind power prediction model includes the following:

When using the data of N time points to predict the wind power at the N+1th time point, the multi-dimensional feature vector at the N time points needs to be used and mapped into a time sequence by the fully connected network in the encoder input layer, and then the sequence information of the time sequence is encoded through the position encoding layer. After the sequence is encoded, the sequence enters the self-attention layer in the encoder layer so that the encoder can pay attention to the information of other coding sequences other than the current coding sequence, and the information of the sequence is retained through the neural network feedforward layer. The encoded time sequence passes through multiple encoder layers and is finally fed to the decoder. Wherein, the multi-dimensional feature vector at the N time points is a time sequence composed of related influence factors of wind power.

In the meantime, the time sequence of wind power corresponding to the N time points is mapped into a time sequence through the decoder input layer, and the time sequence enters the encoding-decoding attention layer in the decoder layer to pay attention to the correlation information of the sequence in the encoder and the decoder. After the feature vector and the time sequence of wind power are learned through the entire Transformer network, the output of decoder is finally obtained through a fully connected layer containing a neuron, which is the predicted value of the wind power at the N+1th time point.

According to another aspect of the disclosure, a wind power prediction system for optimizing a deep Transformer network is provided, including: a data acquisition module configured to take the collected sequence data of wind power and related influencing factors as sample data; a data processing module configured to initialize the Transformer network parameters, set the value range and search range of the hyper-parameters in the Transformer network to be optimized, and determine the maximum number of iteration and population size of the whale group; an optimal parameter acquisition module configured to establish a Transformer network model according to the values of hyper-parameters in the initialized Transformer network, train and predict data in the training set and the test set respectively, and take an average absolute error of wind power prediction as a fitness value of each whale group; determine a local optimal position according to the initial fitness value of the individual whale group, update the current optimal position by utilizing whale group optimization, obtain the optimal prediction effect by comparing the local optimal solution with the global optimal solution; obtain an optimal hyper-parameter combination in the Transformer network after a plurality of iterations of the whale optimization algorithm WOA; a predicting module configured to predict the wind power by using the optimal parameters to construct a WOA-Transformer wind power prediction model.

In some optional implementation, the optimal parameter acquisition module is configured to use the hyper-parameters in the Transformer network as an individual in the whale group, initialize the whale group, and use the random number generator to automatically generate the initial solution of hyper-parameters in the transformer network. If the value of the random parameter p is less than the first preset value, then it is determined whether the coefficient vector |A| is less than the second preset value, and if the coefficient vector |A| is less than the second preset value, then the shrink-envelopment predation mechanism is selected, the position of individual is updated according to A=2a·r−a, C=2r and $$a = 2 - \frac{2j}{M},$$

if the coefficient vector |A| is not less than the second preset value, then the search and predation mechanism is selected, and the position of individual is updated according to $$\begin{cases} X = X_{rand} - A \cdot D \\ D = |C \cdot X_{rand,j} - X| \end{cases},$$

in the expression, a is a constant corresponding to the current number of iterations j, and a is a matrix that is formed by the constant a during the iterations, M is the maximum number of iterations, r is a random vector and r∈[0,1], $X_{rand}$ represents the current random position vector of the humpback whale population, $X_{rand,j}$ represents the j-th data in $X_{rand}$; if the value of the random parameter p is not less than the first preset value, then the spiral predation mechanism is selected, and the position of individual is updated according to $$\begin{cases} X_{j+1} = D'e^{bl}\cos(2\pi l) + X_j^* \\ D' = |X_j^* - X_j| \end{cases},$$

in the expression, $X_j$, $X_{j+1}$ and $X^*_j$ respectively represent the current position, the position at the next moment, and the optimal position of the whale group, D represents the spatial distance between the current optimal position of the i-th whale and the optimal value, b is a logarithmic spiral constant, l is a random number and l∈[−1,1]. The fitness values of all individuals in the whale group are calculated and the global optimal value is updated, and the optimal hyper-parameter combination in the Transformer network is obtained after a plurality of iterations of the whale optimization algorithm WOA.

In some optional implementations, the Transformer network model includes an encoder and a decoder. The encoder is composed of an input layer, a position encoding layer, and multiple identical encoder layers arranged in a stack. The input layer maps the input data into a multi-dimensional vector through a fully connected layer. The position encoding layer adds up the input vector and the position encoding vector element by element, and the vector obtained through addition is fed to each encoder layer. Each encoder layer contains two sub-layers: a self-attention layer and a fully connected feedforward layer, each sub-layer is followed by a norm layer, and the multi-dimensional vector generated by the encoder is fed to the decoder.

The decoder is composed of an input layer, multiple identical decoder layers and an output layer arranged in a stack. The input layer maps the input of decoder into a multi-dimensional vector. Each decoder layer not only contains two sub-layers in the encoder layer, but also is inserted with an encoding-decoding attention layer to apply the self-attention mechanism to the output of the encoder. The output layer contains a single neuron. The output layer maps the output of the last decoder layer to obtain the value for wind power prediction.

In some optional implementations, the predicting module is configured to: When using the data of N time points to predict the wind power at the N+1th time point, the multi-dimensional feature vector at the N time points needs to be used and mapped into a time sequence by the fully connected network in the encoder input layer, and then the sequence information of the time sequence is encoded through the position encoding layer. After the sequence is encoded, the sequence enters the self-attention layer in the encoder layer so that the encoder can pay attention to the information of other coding sequences other than the current coding sequence, and the information of the sequence is retained through the neural network feedforward layer. The encoded time sequence passes through multiple encoder layers and is finally fed to the decoder. Wherein, the multi-dimensional feature vector at the N time points is a time sequence composed of related influence factors of wind power.

In the meantime, the time sequence of wind power corresponding to the N time points is mapped into a time sequence through the decoder input layer, and the time sequence enters the encoding-decoding attention layer in the decoder layer to pay attention to the correlation information of the sequence in the encoder and the decoder. After the feature vector and the time sequence of wind power are learned through the entire Transformer network, the output of decoder is finally obtained through a fully connected layer containing a neuron, which is the predicted value of the wind power at the N+1th time point.

According to another aspect of the disclosure, a computer-readable storage medium is provided, on which a computer program is stored. When the computer program is executed by a processor, the steps of the method described in any one of the embodiments are implemented.

Generally speaking, compared with the conventional technology, the above technical solutions conceived by the disclosure can achieve the following advantageous effects. The deep Transformer network of the disclosure can support parallel operations to improve the efficiency of model training. The self-attention mechanism in the network can learn useful information about time sequences with complex dependencies of various lengths. In the meantime, in order to avoid the blindness of the network in selecting hyper-parameters, the whale optimization algorithm (WOA) is used to optimize the hyper-parameters (learning rate, epoch, batchsize, and dropout) in the Transformer network, so as to obtain the optimal hyper-parameter combination in the Transformer network, and use the optimal parameters to construct a WOA-Transformer wind power predicting model. The disclosure combines optimization algorithms and deep learning prediction algorithms to greatly improve the accuracy of wind power prediction.

DESCRIPTION OF EMBODIMENTS

In order to make the purpose, technical solutions, and advantages of the present disclosure clearer, the following further describes the present disclosure in detail with reference to the accompanying drawings and embodiments. It should be understood that the specific embodiments described here are only used to explain the present disclosure, but not to limit the present disclosure. In addition, the technical features involved in the various embodiments of the present disclosure described below can be combined with each other as long as they do not conflict with each other.

Figure 1:
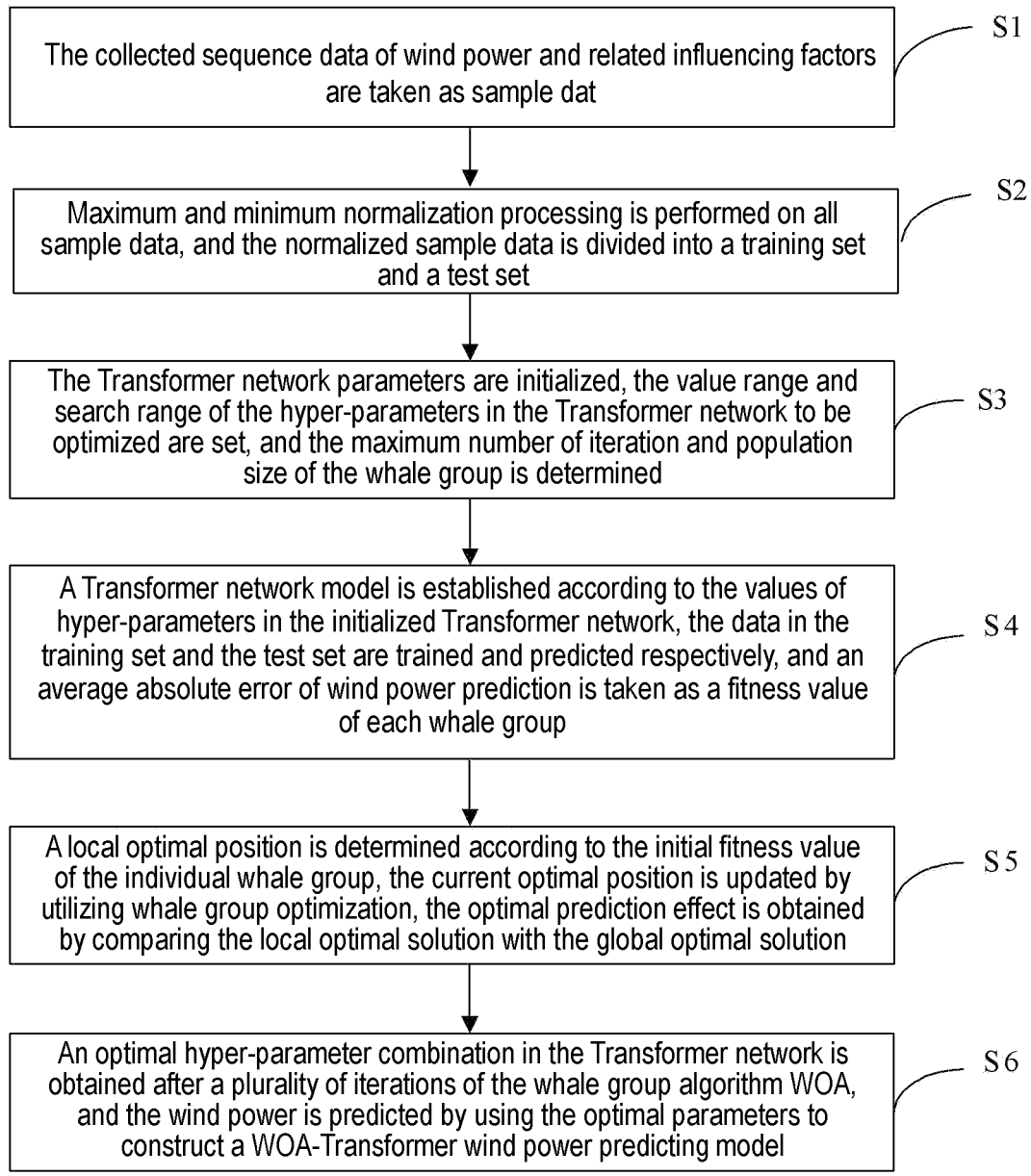
FIG. 1 is a schematic flowchart of a method provided in an embodiment of the disclosure.
Figure 2:
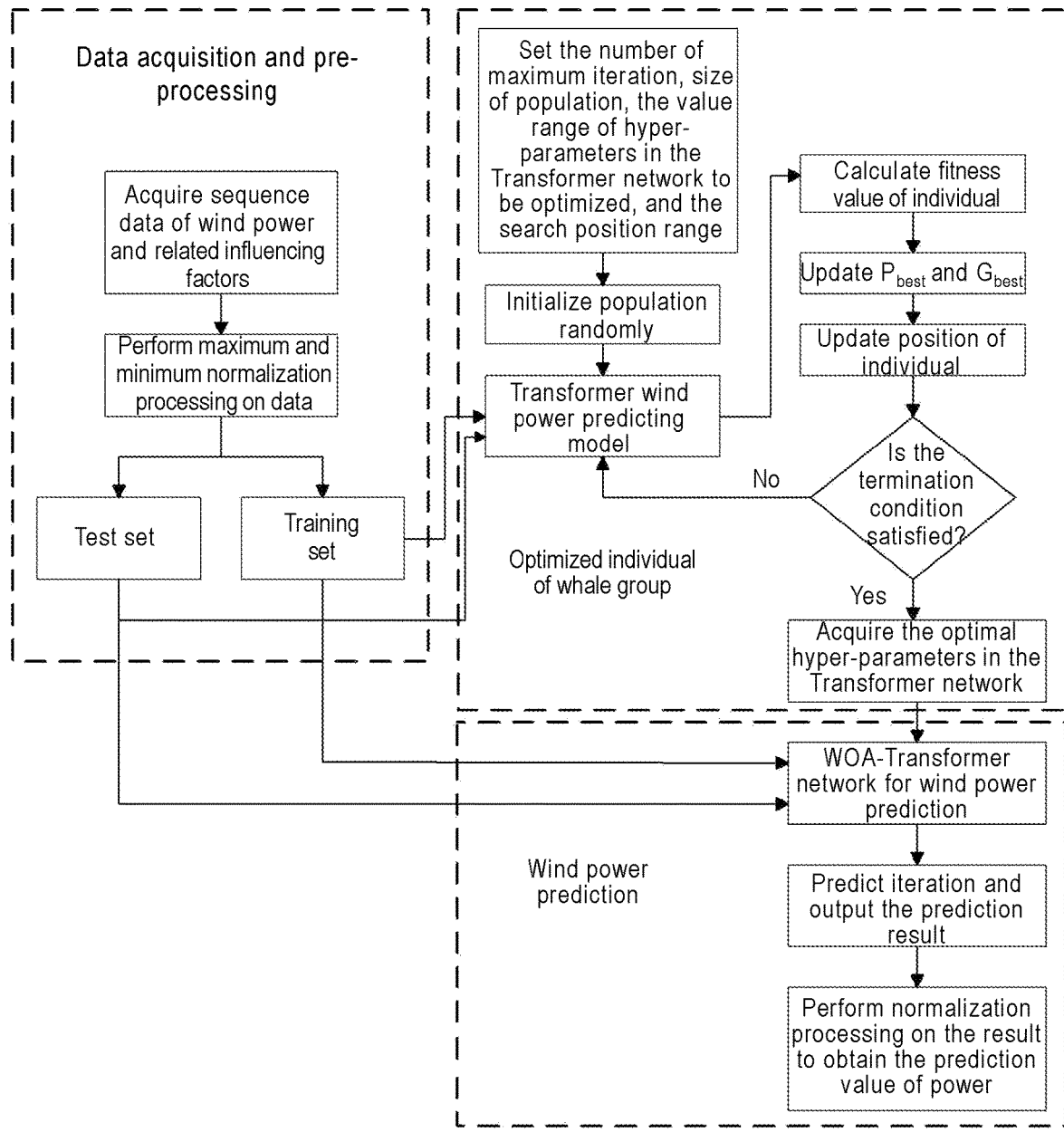
FIG. 2 is a schematic flowchart of another method provided in an embodiment of the disclosure.

FIG. 1 and FIG. 2 are schematic flow diagrams of a wind power prediction method for optimizing a deep Transformer network based on a whale optimization algorithm, including the following steps:

Step S1: The collected sequence data of wind power and related influencing factors (including: wind direction, wind speed, air temperature, ground pressure and air density at the height of the hub) are taken as sample data.

According to historical data, the combination of wind power, wind direction, wind speed, air temperature, ground pressure, and air density at the height of the hub at various time points is taken as a sample data.

Step S2: Maximum and minimum normalization processing is performed on all sample data, and the normalized sample data is divided into a training set and a test set.

Step S3: The Transformer network parameters are initialized, the value range and search range of the hyper-parameters (such as learning rate, epoch, batchsize and dropout) in the Transformer network to be optimized are set, and the maximum number of iteration and population size of the whale group is determined.

Step S4: A Transformer network model is established according to the values of hyper-parameters in the initialized Transformer network, the data in the training set and the test set are trained and predicted respectively, and an average absolute error of wind power prediction is taken as a fitness value of each whale group.

Step S5: A local optimal position is determined according to the initial fitness value of the individual whale group, the current optimal position is updated by utilizing whale group optimization, the optimal prediction effect is obtained by comparing the local optimal solution with the global optimal solution.

Step S6: An optimal hyper-parameter combination in the Transformer network is obtained after a plurality of iterations of the whale group algorithm WOA, and the wind power is predicted by using the optimal parameters to construct a WOA-Transformer wind power predicting model.

The whale optimization algorithm in the embodiment of the disclosure is analogous to three behaviors that occur when humpback whales forage, and the three behaviors are surround predation, foaming net attack, and search and predation.

(a) Mathematical Expression of Surround Predation Behavior

When the whale finds its prey, the whale will continuously update its position to gradually get closer to the prey. The optimal solution in the space is unknown before searching the entire space. It is necessary to constantly adjust one's own position on the basis of one's current position. $X_j$, $X_{j+1}$ and $X^*_j$ might as well be taken to represent the current position, the position at the next moment, and the optimal position of the whale group, and j is the current number of iterations, then:

$$X_{j+1} = X_j - A \cdot D \quad (1)$$

$$D = |C \cdot X^*_j - X_j| \quad (2)$$

In the expression, A and C are called coefficient vectors, and the calculation process is as follows:

$$A = 2a \cdot r - a, \; C = 2r \quad (3)$$

$$a = 2 - \frac{2j}{M} \quad (4)$$

In the expression, a is a constant corresponding to the current number of iterations j, and a is a matrix that is formed by the constant a during the iterations, M is the maximum number of iterations, r is a random vector and $r \in [0,1]$. From equation (4), it can be seen that a decreases linearly from 2 to 0.

(b) Mathematical Expression of the Foaming Net Attack Behavior of Humpback Whale This behavior mainly includes two processes, namely shrinking envelopment and spiral position update. The shrinking and enveloping process is mainly realized by the change of the value of a in equation (4). When j increases, the value of a will decrease. Clearly, the change range of vector A is also decreasing. The vector A changes in the interval [−a, a], and a decreases linearly from 2 to 0 in the iteration process. The vector A is set to a random number on [−1,1], and the updated position of the humpback whale can be any position between the original position before the update and the optimal position.

In the process of spiral position update, first it is necessary to calculate how far the whale group is from their prey, and then a spiral mathematical model is established to analogize the spiral swimming process of humpback whales.

$$\begin{cases} X_{j+1} = D' e^{bl} \cos(2\pi l) + X^*_j \\ D' = |X^*_j - X_j| \end{cases} \quad (5)$$

In the equation, D represents the distance from the current optimal position of the i-th whale to the prey, b is the logarithmic spiral constant, l is a random number and $l \in [-1,1]$.

Considering the condition where the shrinking envelopment process and the spiral position update process occur simultaneously, it may be assumed that the threshold for selecting these two processes is 50%, that is, simultaneous occurrence of the two processes is regarded as a certain probability and only one of them is selected, in which case:

$$X_{j+1} = \begin{cases} X_j - A \cdot D, \; p < 0.5 \\ D' e^{bl} \cos(2\pi l) + X^*_{rand,j}, \; p \geq 0.5 \end{cases} \quad (6)$$

In the equation, p is a random number and $p \in [0,1]$.

(c) Mathematical Expression of Predation Behavior

Considering a broader predation range of the whale group, the main search range of the whale group in the first two behaviors is [−1,1], but there might also be better prey outside of this range. In order to search for the global optimal solution, the method of randomly selecting the current position of the whale is adopted, and the process of searching for predation can also be established on the basis of the random vector A. Under the circumstances, the scope of the research satisfies $|A|>1$, then:

$$\begin{cases} X = X_{rand} - A \cdot D \\ D = |C \cdot X_{rand,j} - X| \end{cases} \quad (7)$$

In the equation, $X_{rand}$ represents the current random position vector of the humpback whale population. Here, the selection of individual humpback whale is also random, and $X_{rand,j}$ represents the j-th data in $X_{rand}$.

In actual application, WOA randomly selects three behaviors: surround predation, foaming net attack, and search and predation as the solution to search for the optimal solution. Each time WOA performs iteration and updates, WOA randomly selects an individual whale and optimal solution to the problem. The reduction of parameter a from 2 to 0 plays an extremely important role in the process of updating humpback whale's position during foam net attack and search and predation behavior. When $|A|>1$, the selection mainly focuses on the individual humpback whale. When $|A|<1$, the selection mainly focuses on the optimal position of the humpback whale. The random parameter p allows the humpback whale to switch between spiral movement or circular movement. When the WOA satisfies the termination condition of the iteration, the iteration will be stopped.

Figure 3:
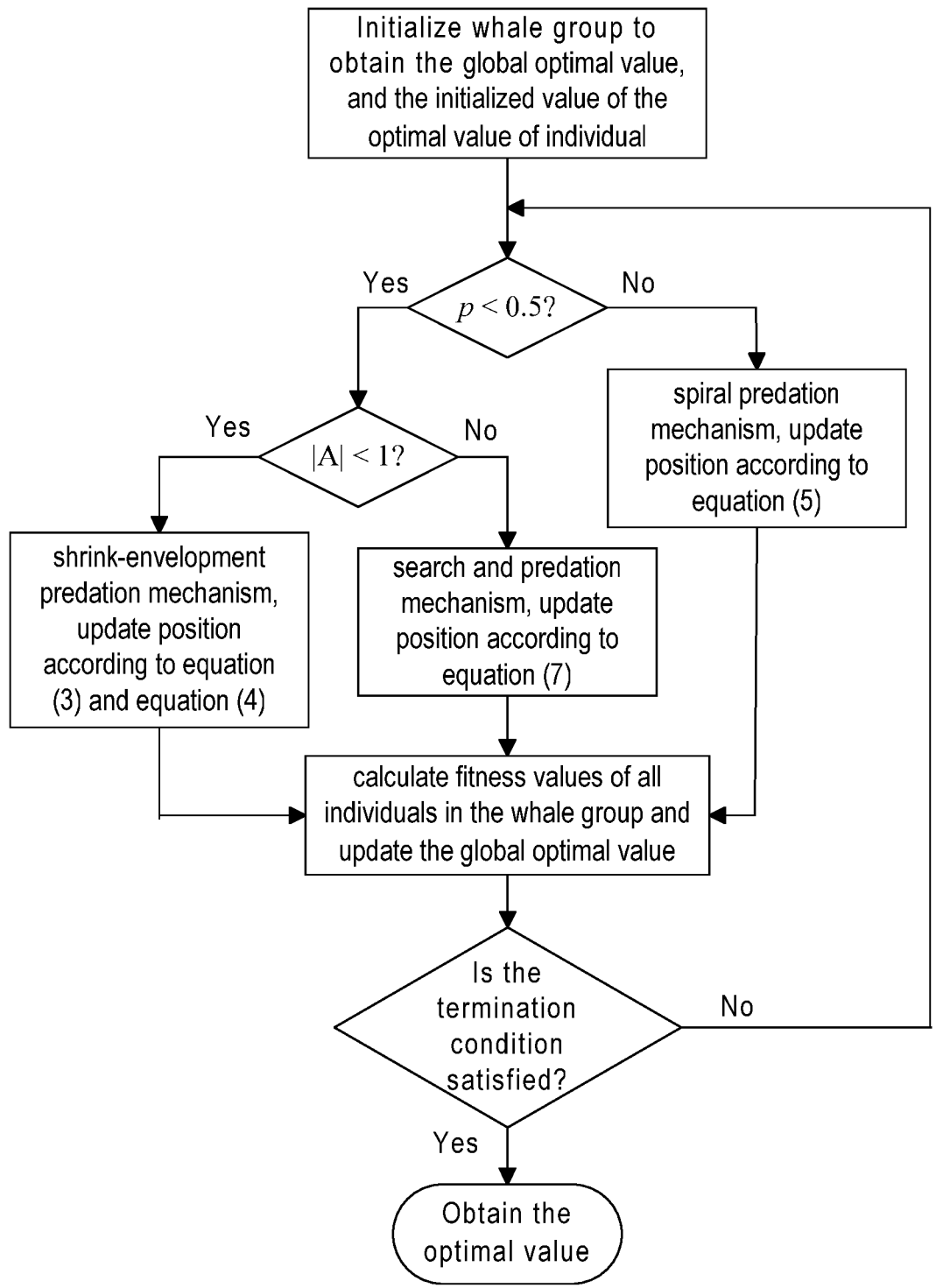
FIG. 3 is a schematic diagram of a process of optimizing hyper-parameters in a network by using a whale optimization algorithm according to an embodiment of the disclosure.

In the embodiment of the disclosure, as shown in FIG. 3, in order to reduce the workload of manually adjusting the hyper-parameters (learning rate, epoch, batchsize, and dropout) of the Transformer model, WOA is adopted to automatically optimize these optimal hyper-parameter combinations. As such, the specific implementation of obtaining the optimal Transformer model to perform power load prediction is as follows:

(1) Whale group initialization: The specific process is to use the random number generator to automatically generate the initial solution of the hyper-parameters in the Transformer.

(2) If the value of the random parameter p is less than the first preset value, then it is determined whether the coefficient vector |A| is less than the second preset value, and if the coefficient vector |A| is less than the second preset value, then the shrink-envelopment predation mechanism is selected, the position of individual is updated according to A=2a·r−a, C=2r and $$a = 2 - \frac{2j}{M},$$

if the coefficient vector |A| is not less than the second preset value, then the search and predation mechanism is selected, and the position of individual is updated according to $$\begin{cases} X = X_{rand} - A \cdot D \\ D = |C \cdot X_{rand,j} - X| \end{cases},$$

in the expression, a is a constant corresponding to the current number of iterations j, and a is a matrix that is formed by the constant a during the iterations, M is the maximum number of iterations, r is a random vector and r∈[0,1], $X_{rand}$ represents the current random position vector of the humpback whale population, $X_{rand,j}$ represents the j-th data in $X_{rand}$.

(3) If the value of the random parameter p is not less than the first preset value, then the spiral predation mechanism is selected, and the position of individual is updated according to $$\begin{cases} X_{j+1} = D'e^{bl}\cos(2\pi l) + X_j^* \\ D' = |X_j^* - X_j| \end{cases},$$

in the expression, $X_j$, $X_{j+1}$ and $X_j^*$ respectively represent the current position, the position at the next moment, and the optimal position of the whale group, in the expression, the position represents the specific value of the hyper-parameters in the Transformer, D represents the spatial distance between the current optimal position of the i-th whale and the optimal value, b is a logarithmic spiral constant, l is a random number and l∈[−1,1].

(4) The fitness values of all individuals in the whale group are calculated, and the global optimal value is updated, and the optimal hyper-parameter combination in the Transformer network is obtained after a plurality of iterations of the whale optimization algorithm WOA. The obtained optimal hyper-parameters are used to optimize the Transformer network model, thereby obtaining the WOA-Transformer wind power predicting model, thus predicting the wind power.

Figure 4:
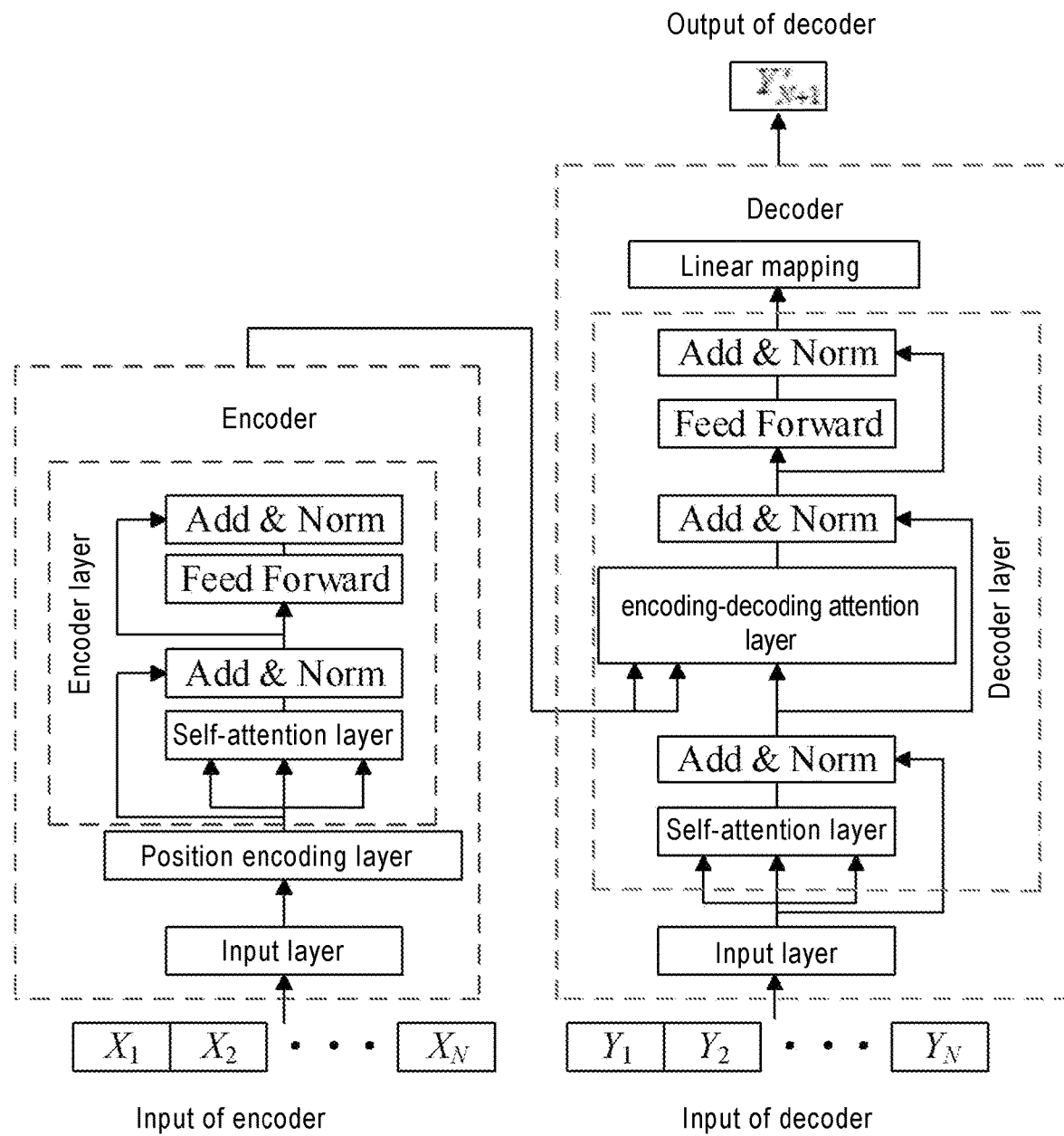
FIG. 4 is a structural diagram of a deep Transformer wind power predicting model embodied by an embodiment of the disclosure.

In the embodiment of the disclosure, in order to solve the wind power prediction problem, the Transformer model for natural language processing designed by Google is modified to process the time sequence. The modified model is shown in FIG. 4, which is mainly composed of an encoder and a decoder.

The encoder is composed of an input layer, a position encoding layer and four identical encoder layers arranged in a stack. The input layer maps the input data into a $d_{model}$-dimensional vector through a fully connected layer. The coding layer adds up the input vector and the position encoding vector element by element. The specific process is performed by using position encoding with sine and cosine functions to encode the sequence information in the time sequence data. The obtained vector is fed to the four encoder layers. Each encoder layer contains two sub-layers: a self-attention layer and a fully connected feedforward layer, each sub-layer is followed by a norm layer, and the $d_{model}$-dimensional vector generated by the encoder is fed to the decoder.

The decoder is composed of an input layer, four identical decoder layers and an output layer arranged in a stack. The input layer maps the input of decoder into a $d_{model}$-dimensional vector. Each decoder layer not only contains two sub-layers in the encoder layer, but also is inserted with a third sub-layer, i.e., encoding-decoding attention layer, to apply the self-attention mechanism to the output of the encoder. Finally, an output layer containing a single neuron maps the output of the last decoder layer to the value for wind power prediction.

This model is adopted to integrate relevant feature vector information and complete the prediction of wind power. When using the data of N time points to predict the wind power at the N+1th time point, it is necessary to map the 5-dimensional feature vectors (wind direction, wind speed, air temperature, ground pressure, and air density at the height of the hub) at N time points into a time sequence through the fully connected network in the encoder input layer. Then the sequence information of the time sequence is encoded through the position encoding layer. After the sequence is encoded, the sequence enters the self-attention layer in the encoder layer so that the encoder can pay attention to the information of other coding sequences other than the current coding sequence, and the information of the sequence is retained through the neural network feedforward layer. The encoded time sequence passes through four encoder layers and is finally fed to the decoder. In the meantime, the wind power corresponding to the N time points is mapped into a time sequence through the decoder input layer, and the process of the time sequence entering the decoder is similar to the sequence transfer process in the encoder. The difference is that there is no encoding layer in the decoder, but an encoding-decoding attention layer is added to the decoding layer to pay attention to the correlation information of the sequence in the encoder and the decoder. After the feature vector and the time sequence of wind power are learned through the entire Transformer network, the output of decoder is finally obtained through a fully connected layer containing a neuron, which is the predicted value of the wind power at the N+1th time point.

In the embodiment of the disclosure, the values of optimal learning rate, epoch, batchsize, and dropout obtained after WOA optimization are selected to set the hyper-parameters of the Transformer. The training set data is adopted for model learning and updating internal parameters, the trained model parameters are saved, and then the test set is adopted to predict wind power.

In the embodiment of the disclosure, through the wind power prediction method for optimizing a deep Transformer network based on a whale optimization algorithm, it is possible to support parallel operations to improve the efficiency of model training. The self-attention mechanism in the network can learn useful information about time sequences with complex dependencies of various lengths. In the meantime, the whale optimization algorithm is adopted to optimize the hyper-parameters of the Transformer model, which reduces the workload of manual adjustment of parameters and also improves the accuracy of wind power prediction.

The disclosure further provides a wind power prediction system for optimizing the deep Transformer network, including: a data acquisition module configured to take the collected sequence data of wind power and related influencing factors as sample data; a data processing module configured to perform maximum and minimum normalization processing on all sample data, and divide the normalized sample data into a training set and a test set; an initialization module configured to initialize the Transformer network parameters, set the value range and search range of the hyper-parameters in the Transformer network to be optimized, and determine the maximum number of iteration and population size of the whale group; an optimal parameter acquisition module configured to establish a Transformer network model according to the values of hyper-parameters in the initialized Transformer network, train and predict data in the training set and the test set respectively, and take an average absolute error of wind power prediction as a fitness value of each whale group; determine a local optimal position according to the initial fitness value of the individual whale group, update the current optimal position by utilizing whale group optimization, and obtain the optimal prediction effect by comparing the local optimal solution with the global optimal solution; obtain an optimal hyper-parameter combination in the Transformer network after a plurality of iterations of the whale optimization algorithm WOA; a predicting module configured to predict the wind power by using the optimal parameters to construct a WOA-Transformer wind power predicting model.

In some optional implementation, the optimal parameter acquisition module is configured to use the hyper-parameters in the Transformer network as an individual in the whale group, initialize the whale group, and use the random number generator to automatically generate the initial solution of hyper-parameters in the transformer network. If the value of the random parameter p is less than the first preset value, then it is determined whether the coefficient vector |A| is less than the second preset value, and if the coefficient vector |A| is less than the second preset value, then the shrink-envelopment predation mechanism is selected, the position of individual is updated according to A=2a·r−a, C=2r and $$a = 2 - \frac{2j}{M},$$

if the coefficient vector |A| is not less than the second preset value, then the search and predation mechanism is selected, and the position of individual is updated according to $$\begin{cases} X = X_{rand} - A \cdot D \\ D = |C \cdot X_{rand,j} - X| \end{cases},$$

in the expression, a is a constant corresponding to the current number of iterations j, and a is a matrix that is formed by the constant a during the iterations, M is the maximum number of iterations, r is a random vector and r∈[0,1], $X_{rand}$ represents the current random position vector of the humpback whale population, $X_{rand,j}$ represents the j-th data in $X_{rand}$; if the value of the random parameter p is not less than the first preset value, then the spiral predation mechanism is selected, and the position of individual is updated according to $$\begin{cases} X_{j+1} = D'e^{bl}\cos(2\pi l) + X_j^* \\ D' = |X_j^* - X_j| \end{cases},$$

in the expression, $X_j$, $X_{j+1}$ and $X_j^*$ respectively represent the current position, the position at the next moment, and the optimal position of the whale group, D represents the distance between the current optimal position of the i-th whale and the prey, b is a logarithmic spiral constant, l is a random number and l∈[−1,1]. The fitness values of all individuals in the whale group are calculated and the global optimal value is updated, and the optimal hyper-parameter combination in the Transformer network is obtained after a plurality of iterations of the whale optimization algorithm WOA.

In some optional implementations, the Transformer network model includes an encoder and a decoder. The encoder is composed of an input layer, a position encoding layer, and multiple identical encoder layers arranged in a stack. The input layer maps the input data into a multi-dimensional vector through a fully connected layer. The position encoding layer adds up the input vector and the position encoding vector element by element, and the vector obtained through addition is fed to each encoder layer. Each encoder layer contains two sub-layers: a self-attention layer and a fully connected feedforward layer, each sub-layer is followed by a norm layer, and the multi-dimensional vector generated by the encoder is fed to the decoder.

The decoder is composed of an input layer, multiple identical decoder layers and an output layer arranged in a stack. The input layer maps the input of decoder into a multi-dimensional vector. Each decoder layer not only contains two sub-layers in the encoder layer, but also is inserted with an encoding-decoding attention layer to apply the self-attention mechanism to the output of the encoder. The output layer contains a single neuron. The output layer maps the output of the last decoder layer to obtain the value for wind power prediction.

In some optional implementations, the prediction module is configured to: When using the data of N time points to predict the wind power at the N+1th time point, the multi-dimensional feature vector at the N time points needs to be used and mapped into a time sequence by the fully connected network in the encoder input layer, and then the sequence information of the time sequence is encoded through the position encoding layer. After the sequence is encoded, the sequence enters the self-attention layer in the encoder layer so that the encoder can pay attention to the information of other coding sequences other than the current coding sequence, and the information of the sequence is retained through the neural network feedforward layer. The encoded time sequence passes through multiple encoder layers and is finally fed to the decoder. Wherein, the multi-dimensional feature vector at the N time points is a time sequence composed of related influence factors of wind power.

In the meantime, the time sequence of wind power corresponding to the N time points is mapped into a time sequence through the decoder input layer, and the time sequence enters the encoding-decoding attention layer in the decoder layer to pay attention to the correlation information of the sequence in the encoder and the decoder. After the feature vector and the time sequence of wind power are learned through the entire Transformer network, the output of decoder is finally obtained through a fully connected layer containing a neuron, which is the predicted value of the wind power at the N+1th time point.

For the specific implementation of each module, reference may be made to the description of the foregoing method embodiment, and the description of the embodiment of the disclosure will not be repeated hereafter.

The disclosure further provides a computer-readable storage medium, on which a computer program is stored. When the computer program is executed by a processor, the wind power prediction method for optimizing a deep Transformer network in method embodiment is implemented.

It needs to be pointed out that according to the needs of implementation, each step/component described in this disclosure can be split into more steps/components, or two or more steps/components or partial operations of steps/components can be combined into new ones to achieve the purpose of the present disclosure.

Those skilled in the art can easily understand that the above are only preferred embodiments of the present disclosure and are not intended to limit the present disclosure. Any modification, equivalent replacement and improvement, etc., made within the spirit and principle of the present disclosure should all be included in the protection scope of the present disclosure.

What is claimed is:

1. A wind power prediction method for optimizing a deep Transformer network, comprising:
taking a collected sequence data of wind power and related influencing factors as a sample data;
performing maximum and minimum normalization processing on all of the sample data, and dividing the normalized sample data into a training set and a test set;
initializing Transformer network parameters, setting a value range and a search range of hyper-parameters in the Transformer network to be optimized, and determining a maximum number of iteration and a population size of a whale group;
establishing a Transformer network model according to the values of the hyper-parameters in the initialized Transformer network, respectively training and predicting the data in the training set and the test set, and taking an average absolute error of wind power prediction as a fitness value of each of the whale groups;
determining a local optimal position according to the initial fitness value of the individual whale group, updating a current optimal position by utilising whale group optimization, and obtaining an optimal prediction effect by comparing a local optimal solution with a global optimal solution;
obtaining an optimal hyper-parameter combination in the Transformer network after a plurality of iterations of the whale optimization algorithm WOA, and predicting wind power by using the optimal parameters to construct a WOA-Transformer wind power prediction model, wherein the step of obtaining the optimal hyper-parameter combination in the Transformer network after the plurality of iterations of the whale optimization algorithm WOA comprises:
taking the hyper-parameters in the Transformer network as individuals in the whale group, initializing the whale group, and using a random number generator to automatically generate an initial solution of the hyper-parameters in the Transformer network;
in response to a value of a random parameter p being less than a first preset value, then it is determined whether a coefficient vector |A| is less than a second preset value, and in response to the coefficient vector |A| being less than the second preset value, then a shrink-envelopment predation mechanism is selected, a position of the individual is updated according to A=2a·r−a,C=2r and $$a = 2 - \frac{2j}{M},$$

in response to the coefficient vector |A| being not less than the second preset value, then a search and predation mechanism is selected, and the position of the individual is updated according to $$\begin{cases} X = X_{rand} - A \cdot D \\ D = |C \cdot X_{rand,j} - X| \end{cases},$$

in the expression, a is a constant corresponding to a current number of iterations j, and a is a matrix that is formed by the constant a during the iterations, M is the maximum number of iterations, r is a random vector and r∈[0,1], $X_{rand}$ represents a current random position vector of a humpback whale population, $X_{rand,i}$ represents the j-th data in $X_{rand}$;
in response to the value of the random parameter p being not less than the first preset value, then a spiral predation mechanism is selected, and the position of the individual is updated according to $$\begin{cases} X_{j+1} = D' e^{bl} \cos(2\pi l) + X_j^* \\ D' = |X_j^* - X_j| \end{cases},$$

in the expression, $X_j$, $X_{j+1}$ and $X^*_j$ respectively represent a current position, a position at the next moment, and an optimal position of the whale group, D represents a spatial distance between the current optimal position of the i-th whale and the optimal value, b is a logarithmic spiral constant, l is a random number and l∈[−1,1];
calculating fitness values of all individuals in the whale group and updating the global optimal value, and obtaining the optimal hyper-parameter combination in the Transformer network after the plurality of iterations of the whale optimization algorithm WOA.

2. The method according to claim 1, wherein the Transformer network model comprises an encoder and a decoder, wherein the encoder is composed of an input layer, a position encoding layer, and a plurality of identical encoder layers arranged in a stack, the input layer maps an input data into a multi-dimensional vector through a fully connected layer, the position encoding layer adds up an input vector and a position encoding vector element by element, and a vector obtained through addition is fed to each of the encoder layers, each of the encoder layers contains two sub-layers: a self-attention layer and a fully connected feedforward layer, each of the sub-layers is followed by a norm layer, and a multi-dimensional vector generated by the encoder is fed to the decoder;

wherein the decoder is composed of the input layer, multiple identical decoder layers and an output layer arranged in a stack, the input layer maps an input of decoder into the multi-dimensional vector, each of the decoder layers not only contains the two sub-layers in the encoder layer, but also is inserted with an encoding-decoding attention layer to apply a self-attention mechanism to an output of the encoder, the output layer contains a single neuron, the output layer maps the output of the last decoder layer to obtain a value for wind power prediction.

3. The method according to claim 2, wherein the step of predicting the wind power by using the optimal parameters to construct the WOA-Transformer wind power prediction model comprises the following:

in response to using data of N time points to predict the wind power at the N+1th time point, the multi-dimensional feature vector at the N time points needs to be used and mapped into the time sequence by the fully connected network in the encoder input layer, and then sequence information of the time sequence is encoded through the position encoding layer, after the sequence is encoded, the sequence enters the self-attention layer in the encoder layer so that the encoder can pay attention to the information of other coding sequences other than the current coding sequence, and the information of the sequence is retained through a neural network feedforward layer, the encoded time sequence passes through the plurality of encoder layers and is finally fed to the decoder, wherein the multi-dimensional feature vector at the N time points is a time sequence composed of related influence factors of wind power;

wherein the time sequence of wind power corresponding to the N time points is mapped into the time sequence through the decoder input layer, and the time sequence enters the encoding-decoding attention layer in the decoder layer to pay attention to correlation information of the sequence in the encoder and the decoder; after the feature vector and the time sequence of wind power are learned through the entire Transformer network, the output of the decoder is finally obtained through the fully connected layer containing one neuron, which is a predicted value of the wind power at the N+1th time point.

4. A wind power prediction system for optimizing a deep Transformer network, comprising:

a data acquisition module comprising processing circuitry configured to take a collected sequence data of wind power and related influencing factors as a sample data;

a data processing module comprising processing circuitry configured to perform maximum and minimum normalization processing on all of the sample data, and divide the normalized sample data into a training set and a test set;

an initialization module comprising processing circuitry configured to initialize Transformer network parameters, set a value range and a search range of hyper-parameters in the Transformer network to be optimized, and determine a maximum number of iteration and a population size of a whale group;

an optimal parameter acquisition module comprising processing circuitry configured to establish a Transformer network model according to the values of the hyper-parameters in the initialized Transformer network, respectively train and predict the data in the training set and the test set, and take an average absolute error of wind power prediction as a fitness value of each of the whale groups; determine a local optimal position according to the initial fitness value of the individual whale group, update a current optimal position by utilising whale group optimization, and obtain an optimal prediction effect by comparing a local optimal solution with a global optimal solution; obtain an optimal hyper-parameter combination in the Transformer network after a plurality of iterations of the whale optimization algorithm WOA;

a predicting module comprising processing circuitry configured to predict wind power by using the optimal parameters to construct a WOA-Transformer wind power prediction model, wherein the optimal parameter acquisition module is configured to take the hyper-parameters in the Transformer network as individuals in the whale group, initialize the whale group, and use a random number generator to automatically generate an initial solution of the hyper-parameters in the Transformer network; if a value of a random parameter p is less than a first preset value, then it is determined whether a coefficient vector |A| is less than a second preset value, and if the coefficient vector |A| is less than the second preset value, then a shrink-envelopment predation mechanism is selected, a position of the individual is updated according to A=2a·r−a, C=2r and $$a = 2 - \frac{2j}{M},$$

if the coefficient vector |A| is not less than the second preset value, then a search and predation mechanism is selected, and the position of the individual is updated according to $$\begin{cases} X = X_{rand} - A \cdot D \\ D = |C \cdot X_{rand,j} - X| \end{cases},$$

in the expression, a is a constant corresponding to a current number of iterations j, and a is a matrix that is formed by the constant a during the iterations, M is the maximum number of iterations, r is a random vector and r∈[0,1], $X_{rand}$ represents a current random position vector of a humpback whale population, $X_{rand,i}$ represents the j-th data in $X_{rand}$; if the value of the random parameter p is not less than the first preset value, then a spiral predation mechanism is selected, and the position of the individual is updated according to $$\begin{cases} X_{j+1} = D' e^{bl} \cos(2\pi l) + X_j^* \\ D' = |X_j^* - X_j| \end{cases},$$

in the expression, $X_j$, $X_{j+1}$, and $X_j^*$ respectively represent a current position, a position at the next moment, and an optimal position of the whale group, D represents a spatial distance between the current optimal position of the i-th whale and the optimal value, b is a logarithmic spiral constant, l is a random number and l∈[−1,1], calculate fitness values of all individuals in the whale group and update the global optimal value, and obtain the optimal hyper-parameter combination in the Transformer network after the plurality of iterations of the whale optimization algorithm WOA.

5. The system according to claim 4, wherein the Transformer network model comprises an encoder and a decoder, wherein the encoder is composed of an input layer, a position encoding layer, and a plurality of identical encoder layers arranged in a stack, the input layer maps an input data into a multi-dimensional vector through a fully connected layer, the position encoding layer adds up an input vector and a position encoding vector element by element, and a vector obtained through addition is fed to each of the encoder layers, each of the encoder layers contains two sub-layers: a self-attention layer and a fully connected feedforward layer, each of the sub-layers is followed by a norm layer, and a multi-dimensional vector generated by the encoder is fed to the decoder;

wherein the decoder is composed of the input layer, multiple identical decoder layers and an output layer arranged in a stack, the input layer maps an input of decoder into the multi-dimensional vector, each of the decoder layers not only contains the two sub-layers in the encoder layer, but also is inserted with an encoding-decoding attention layer to apply a self-attention mechanism to an output of the encoder, the output layer contains a single neuron, the output layer maps the output of the last decoder layer to obtain a value for wind power prediction.

6. The system according to claim 5, wherein the predicting module is configured to, when using data of N time points to predict the wind power at the N+1 th time point, the multi-dimensional feature vector at the N time points needs to be used and mapped into the time sequence by the fully connected network in the encoder input layer, and then sequence information of the time sequence is encoded through the position encoding layer, after the sequence is encoded, the sequence enters the self-attention layer in the encoder layer so that the encoder can pay attention to the information of other coding sequences other than the current coding sequence, and the information of the sequence is retained through a neural network feedforward layer, the encoded time sequence passes through the plurality of encoder layers and is finally fed to the decoder, wherein the multi-dimensional feature vector at the N time points is a time sequence composed of related influence factors of wind power;

wherein the time sequence of wind power corresponding to the N time points is mapped into the time sequence through the decoder input layer, and the time sequence enters the encoding-decoding attention layer in the decoder layer to pay attention to correlation information of the sequence in the encoder and the decoder; after the feature vector and the time sequence of wind power are learned through the entire Transformer network, the output of the decoder is finally obtained through the fully connected layer containing one neuron, which is a predicted value of the wind power at the N+1th time point.

7. A non-transitory computer-readable storage medium, on which a computer program is stored, wherein when the computer program is executed by a processor, steps of the method claimed in claim 1 are implemented.

8. A non-transitory computer-readable storage medium, on which a computer program is stored, wherein when the computer program is executed by a processor, steps of the method claimed in claim 2 are implemented.

9. A non-transitory computer-readable storage medium, on which a computer program is stored, wherein when the computer program is executed by a processor, steps of the method claimed in claim 3 are implemented.

* * * * *